(12) United States Patent
Goodfellow (10) Patent No.: US 6,529,302 B1
(45) Date of Patent: Mar. 4, 2003

(54) CHANNEL SWITCHING IN WAVELENGTH ENCODED OPTICAL COMMUNICATION SYSTEMS

(75) Inventor: Robert C Goodfellow, Northants (GB)

(73) Assignee: Marconi Communications Limited (GB)

( * ) Notice: Subject to any disclaimer, the term of this patent is extended or adjusted under 35 U.S.C. 154(b) by 0 days.

(21) Appl. No.: 09/391,759

(22) Filed: Sep. 8, 1999

(30) Foreign Application Priority Data

Apr. 1, 1999 (GB) .............................................. 9907577

(51) Int. Cl.$^7$ ................................................ H04J 14/02
(52) U.S. Cl. ....................... 359/128; 359/124; 359/172; 385/17; 385/24
(58) Field of Search ................................ 359/128, 124, 359/172, 130; 385/17, 24, 37

(56) References Cited

U.S. PATENT DOCUMENTS

| | | | |
|---|---|---|---|
| 5,652,814 A | | 7/1997 | Pan et al. |
| 5,748,349 A | | 5/1998 | Mizrahi |
| 6,002,504 A | * | 12/1999 | Tillerot et al. ............... 359/172 |
| 6,201,907 B1 | * | 3/2001 | Farries ......................... 385/24 |
| 6,256,428 B1 | * | 7/2001 | Norwood et al. ............. 385/17 |
| 6,348,984 B1 | * | 2/2002 | Mizrahi ....................... 359/124 |

FOREIGN PATENT DOCUMENTS

| | | |
|---|---|---|
| EP | 0 814 629 A2 | 12/1997 |
| GB | 2 014 752 A | 8/1979 |
| GB | 2 315 380 A | 1/1998 |
| WO | WO 97/06614 | 2/1997 |
| WO | WO 97/06617 | 2/1997 |
| WO | WO 98/05133 | 2/1998 |

* cited by examiner

*Primary Examiner*—John A. Tweel
(74) *Attorney, Agent, or Firm*—Kirschstein, et al.

(57) ABSTRACT

An optical switching arrangement, e.g. an add-drop multiplexer or switch, for receiving an input signal comprising a plurality of input wavelength encoded optical channels. The arrangement includes a selector for selecting from the plurality of input optical channels for forming a plurality of output signals comprising selected ones of the plurality of input optical channels. A combination of input optical channels in any one of the plurality of output signals is different from a combination of input optical channels in the input signal. The selector comprises a plurality of selective reflectors for selectively reflecting optical channels selected from the plurality of input optical channels. The plurality of selective reflectors are arranged to selectively reflect each of the input optical channels selected for forming the plurality of output signals. The plurality of selective reflectors comprise a first set of selective reflectors for passing a first set of selected optical input channels and reflecting a second set of selected optical input channels and a second set of selective reflectors for reflecting the first set of selected optical input channels and passing the second set of selected optical input channels.

25 Claims, 5 Drawing Sheets

CHANNEL SWITCHING IN WAVELENGTH ENCODED OPTICAL COMMUNICATION SYSTEMS

BACKGROUND OF THE INVENTION

The invention relates to the field of communications, in particular to wavelength encoded optical communication systems, and more particularly to optical switching means i.e. means for adding, dropping and multiplexing or switching wavelength encoded optical channels.

Optical communications systems are a substantial and fast-growing constituent of communication networks. The expression optical communication system, as used herein, relates to any system that uses optical signals to convey information. Such optical systems include, but are not limited to, telecommunications systems, cable television systems, and local area networks (LANs). Optical systems are described in Gowar, Ed. Optical Communication Systems, Prentice Hall, N.Y. Currently, the majority of optical communication systems are configured to carry an optical channel of a single wavelength over one or more optical waveguides. To convey information from a plurality of sources, time-division multiplexing (TDM) is frequently employed. In time-division multiplexing, a particular time slot is assigned to each signal source, the complete signal from one of the signal sources being reconstructed from the portions of the signals collected from the relevant time slots. While this is a useful technique for carrying information from a plurality of sources on a single channel, its capacity is limited by fibre dispersion and the need to generate high peak power pulses.

While the need for communication services increases, the current capacity of existing waveguiding media is limited. Although capacity may be expanded, e.g. by laying more fibre optic cables, the cost of such expansion is prohibitive. Consequently, there exists a need for a cost-effective way to increase the capacity of existing optical waveguides.

Wavelength division multiplexing (WDM) is now used for increasing the capacity of existing fibre optic networks. In a WDM system a plurality of optical signal channels are carried over a single waveguide, each channel being wavelength encoded i.e. assigned a distinct part of the spectrum. Ideally each channel will be allocated to a wavelength band centered upon a single wavelength. In practice, due to the shortcomings of available sources and spectral broadening due to the modulation on the carrier and due to the dispersion and propagation of transmission media, each signal channel will spread across the spectrum to a greater or lesser extent. References herein to a wavelength are to be interpreted accordingly.

Optical fibre networks have been explored to permit the transfer of optical signals carrying WDM channels (WDM signals) bearing analogue or digital data, from one optical fibre in one loop, ring, cell of a mesh or line of a network to a different loop, ring, cell of a mesh or line of the network directly, in optical form, without the need to convert the signals into electrical form at interconnection points of the network. These interconnection points (or nodes) comprise optical add-drop multiplexers OADMs or optical cross connects OXCs.

Several methods to achieve optical add drop multiplexing (or switching) and optical cross connect switching are described in the proceedings of the European Conference Optical Communications, September, 1998, Madrid, Spain and the Optical Fibre Conference, February 1998, USA.

Figure 1:
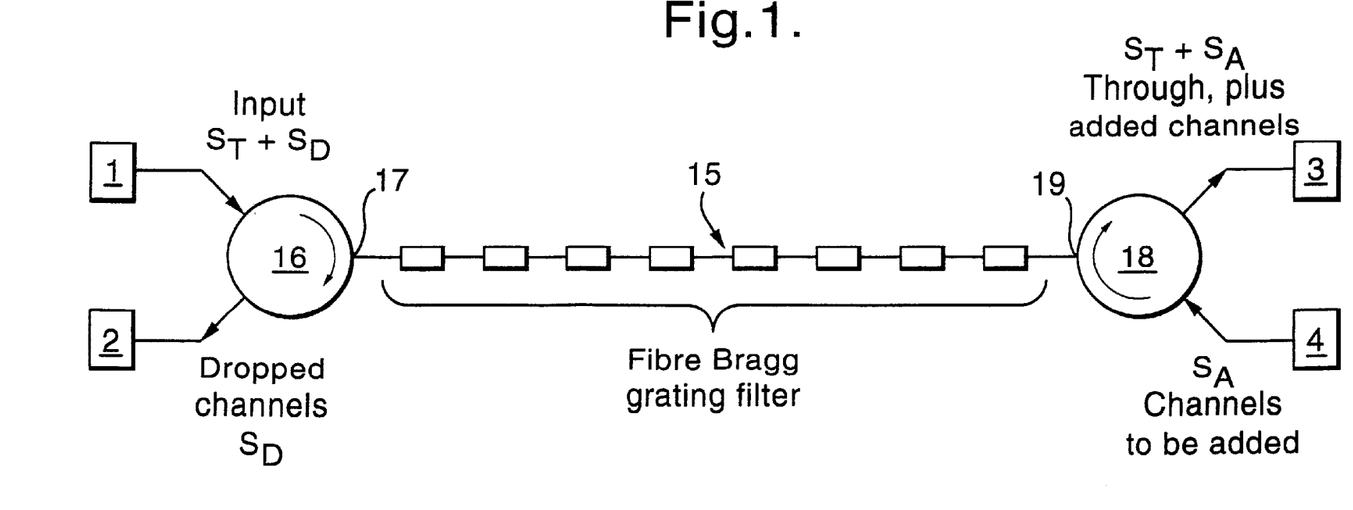
FIG. 1 shows in diagrammatic form an optical add-drop multiplexer of the prior art.

FIG. 1 shows a known optical add-drop arrangement. The arrangement has four external ports identified by numbers inside rectangles. External port 1 is the Input port for an input signal comprising a set $S_{IN}$ of input channels. This set $S_{IN}$ may be made up from a set $S_T$ of through channels and a set $S_D$ of drop channels. Port 2 is the Drop port where a drop signal comprising the set $S_D$ of drop channels emerges. External port 3 is the Thru' port for the output of a through signal comprising the set $S_T$ of through channels and any add channels $S_A$ and port 4 is the Add port for the introduction of an add signal comprising add channels $S_A$. The above channels are wavelength encoded, (e.g. WDM) optical channels.

According to the known arrangement of FIG. 1, switching of one or more selected channels from the set $S_{IN}$ of input channels is achieved by passing the set $S_{IN}=S_T+S_D$ into a first port Port 1 of a first optical circulator 16. These channels will exit first optical circulator 16 at a second port 17. A series of tunable optical filters represented by rectangles are positioned in optical guide 15 leading from second port 17 of first circulator 16 to a first port 19 on second circulator 18 such that selected ones $S_T$ of the set $S_{IN}$ of input channels are passed by the series of filters to second circulator 18, while the other ones $S_D$ of the set $S_{IN}$ of input channels are reflected back into second port 17 of first circulator 16 to emerge at a third port thereof, i.e., the Drop port 2, to form the drop signal.

The through channels $S_T$ enter second circulator 18 at first port 19 thereof and emerge at Thru' port 3 forming the through signal. If it is desired to add channels $S_A$ to the through signal at Thru' port 3 i.e. to replace those channels $S_D$ dropped as a result of being reflected by one of the filters, these channels $S_A$ may be inserted at a third port, i.e. Add Port 4 of second circulator 18 such that they emerge at first port 19 and encounter the series of tunable optical filters positioned between the first and second optical circulators. If the add channels $S_A$ are assigned to some of the same wavelengths as the drop channels $S_D$, they will be reflected back into second circulator 18 at first port 19 thereof and will emerge at Thru' port 3 together with the through channels $S_T$.

In the arrangement of FIG. 1 a filter is required in waveguide 15 leading from the first circulator to the second circulator for each input channel. Switching is achieved by arranging that the filters may be de-tuned or adjusted by an amount comparable to the spectral width of a channel. Hence, if a filter is arranged to normally reflect a particular channel, de-tuning will cause it to pass that channel. Alternatively, the filter may be arranged to normally pass and on de-tuning to reflect a particular channel. This process allows any sub-set of channels to be selected from the total input set $S_{IN}$.

The performance of the system of FIG. 1 and similar systems will depend on the performance of the filters. Important system performance parameters are insertion loss between ports (i.e. power loss between Ports 1 and 2, 1 and 3, 4 and 3) and the signal rejection (i.e. power coupled into the wrong port such as from Port 1 to Port 3 for channels that have been dropped) and from Port 4 to Port 2 for added channels. The ideal filter response would be zero outside of the desired reflection band and 100% within the band so that when tuned or de-tuned for reflection no power is transmitted through the filter and all is reflected. The rejection and insertion losses would then be limited by imperfections in the optical circulators.

In practice compromises have to be made in the design of a filter. A highly reflective design has high loss outside of the reflection band which increases the insertion loss for other channels passing through it. The more filters used, the greater the insertion loss. A lower reflectivity filter produces less insertion loss for the other channels passing through it but passes more of the optical energy of the channel to be reflected so that the rejection performance becomes poorer. This can cause problems, for example if a new channel is added to the signal passed by the filters. If, as is commonly the case, it is desired to reuse the spectral band occupied by a channel that has been dropped in an OADM (i.e. by reflection by a filter) for adding a new channel, then corruption of the new channel can occur due to optical energy from the dropped channel passed by the lower reflectivity filter.

Thus the design of FIG. 1 will work acceptably for cases where the number of filters in a series is small but the performance deteriorates as the number of filters increases. Hence a problem exists with known OADMs where selected output channels contain unwanted residual elements from other channels. Known designs of optical switch also use series of selectively reflective optical filters as selective reflectors. The same problem is encountered with these known designs of optical switch in that selected output channels contain unwanted elements from other channels.

SUMMARY OF THE INVENTION

The present invention provides an optical switching means for receiving an input signal comprising a plurality of input wavelength encoded optical channels the switching means comprising selection means for selecting from the plurality of input optical channels for forming a plurality of output signals comprising selected ones of the plurality of input optical channels in which the combination of input optical channels in any one of the plurality of output signals is different from the combination of input optical channels in the input signal; in which the selection means comprises a plurality of selective reflectors for selectively reflecting optical channels selected from the plurality of input optical channels, and in which the plurality of selective reflectors are arranged to selectively reflect each of the input optical channels selected for forming the plurality of output signals.

The present invention also provides an optical switching means comprising a plurality of ports, the switching means for forming at the plurality of ports from a plurality of wavelength encoded input optical channels a plurality of output optical signals comprising wavelength encoded output optical channels in which the switching means comprises selective reflectors each selective reflector for reflecting a first portion of a selected input optical channel to form an output channel and for passing a residual portion of the selected input optical channel in which the switching means comprises separation means for separating the residual portions from the output signals.

The present invention also provides an optical switching means for receiving an input signal comprising a plurality of input wavelength encoded optical channels the switching means comprising selection means for selecting from the plurality of input optical channels for forming a plurality of output signals comprising selected ones of the plurality of input optical channels, in which the selection means comprises a plurality of selective reflectors for selectively reflecting optical channels selected from the plurality of input optical channels, in which the plurality of selective reflectors comprise a first set of selective reflectors for passing a first set of selected optical input channels and for reflecting a second set of selected optical input channels and a second set of selective reflectors for reflecting the first set of selected optical input channels and for passing the second set of selected optical input channels.

In a preferred embodiment, the present invention provides an optical switch comprising the above optical switching means.

In a further preferred embodiment, the present invention provides an optical add-drop multiplexer comprising the above optical switching means.

BRIEF DESCRIPTION OF THE DRAWINGS

Embodiments of the present invention will now be described by way of example with reference to the drawings in which.

DETAILED DESCRIPTION OF THE PREFERRED EMBODIMENTS

Figure 2A:
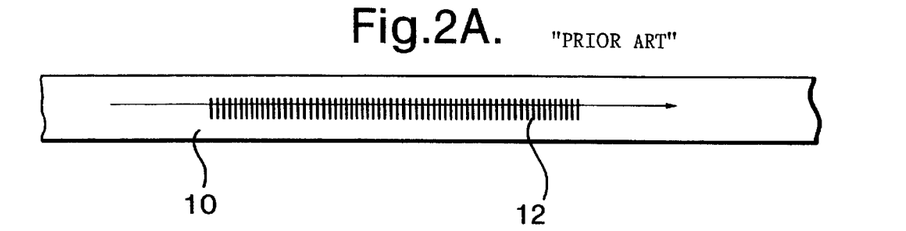
FIG. 2 shows in cross section an optical fibre and fibre Bragg grating of the prior art.
Figure 2B:
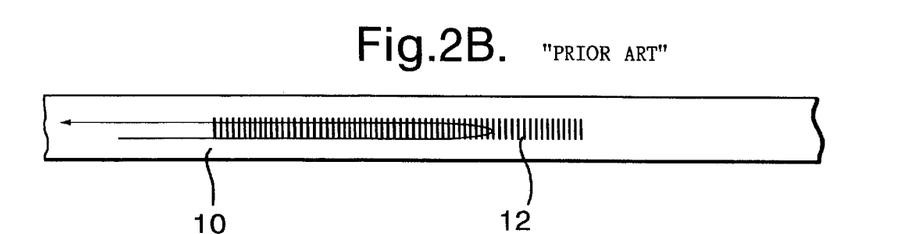

An optical add-drop multiplexer according to the invention could advantageously comprise fibre Bragg grating optical filters, as shown in FIG. 2. FIG. 2 shows a fibre Bragg grating consisting of an optical fibre 10 in which a series of variations (represented diagrammatically by the lines 12) in the refractive index of the material (eg., glass) of the optical fibre are formed. The lines form a diffraction grating that acts to pass incident radiation of most wavelengths (as represented by the arrow of FIG. 2a) and to reflect incident radiation of particular wavelengths (as represented by the arrow of FIG. 2b), depending on the spacing of the lines.

Alternatively, the optical filters could comprise multilayer dielectric filters acting as selectively reflective mirrors. In practice a plurality of such filters may be arranged in series with each successive filter active in a different part of the spectrum. Typically light reflected by a first multilayer dielectric filter will become incident at the next multilayer dielectric filter in the series, whereas light passed by a first FBG filter will become incident at the next FBG filter in the series.

Figure 3:
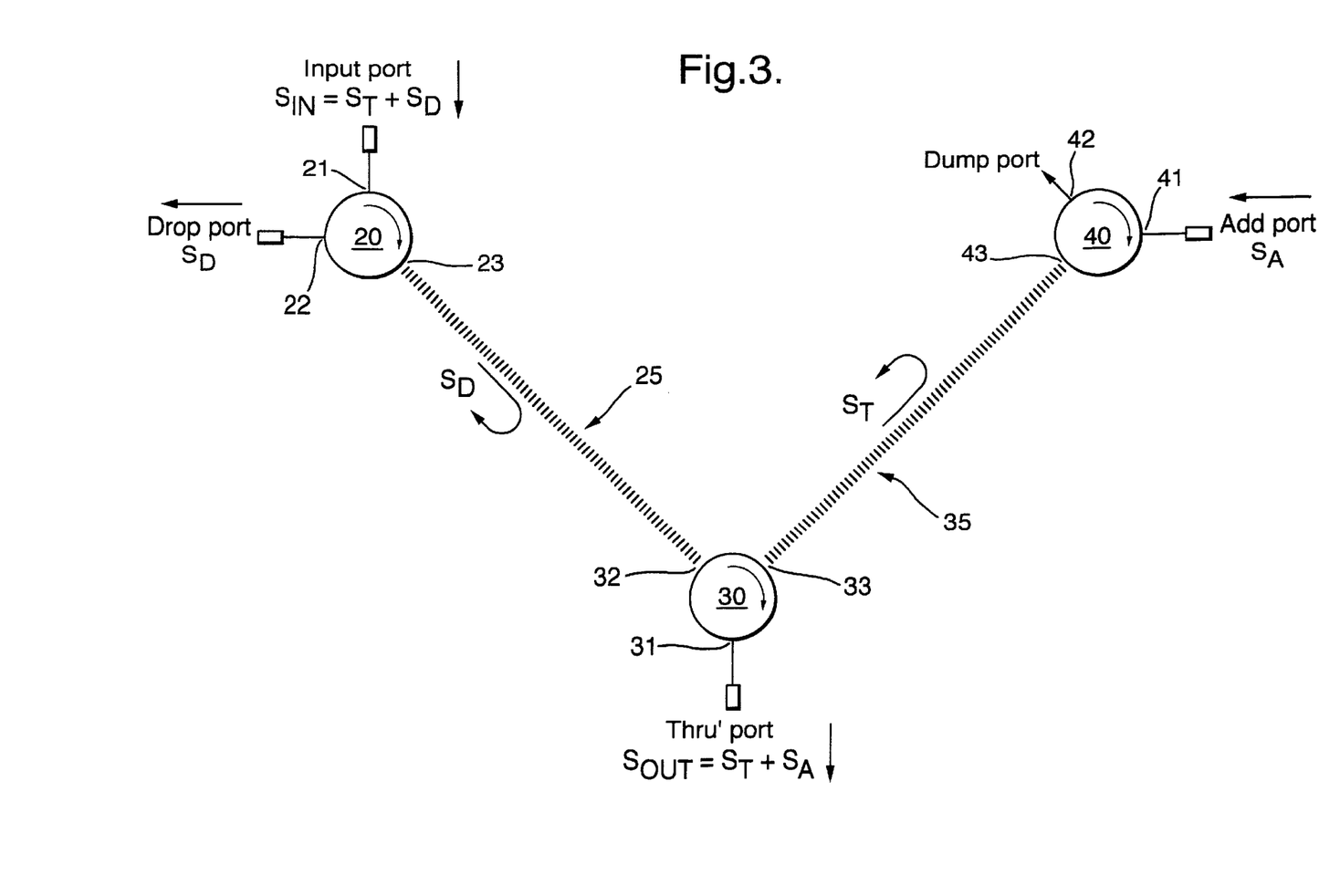
FIG. 3 shows an optical add-drop arrangement according to a first embodiment of the present invention.

FIG. 3 shows a first embodiment of the invention. As with the prior art arrangement of FIG. 1, the add-drop multiplexer of FIG. 3 comprises four external ports: Input, Drop, Through (Thru') and Add and in addition a fifth port, Dump. The function of the first four of these ports is as described for the arrangement of FIG. 1 and will not be described further here.

The Dump port is used to dispose of any residual elements of a selected channel generated by unwanted transmission in an "imperfect" filter (i.e. a filter that does not reflect 100% of the incident optical energy in the desired reflection band i.e. in the spectral band corresponding to the selected channel). These unwanted residual channel elements take the form of optical energy at a particular wavelength or in a particular band of wavelengths passed by a filter set up to reflect optical channels at that wavelength or in that band.

The add-drop arrangement of FIG. 3 will now be described in detail. The add-drop multiplexer of FIG. 3 has three optical circulators, a first circulator 20 comprising the Input 21 and Drop 22 ports, a second circulator 30 comprising the Thru' port 31 and a third circulator 40 comprising the Add 41 and Dump 42 ports.

An optical guide 25, e.g. an optical fibre or waveguide, links a third port 23 on first optical circulator 20 with a second port 32 on second optical circulator 30. A second optical guide 35 links a third port 33 on second optical circulator 30 with a third port 43 on third optical circulator 40. Both optical guides 25, 35 contain a series of tunable optical filters indicated by the series of short transverse lines. As indicated above, filters with high reflectivity have unwanted attenuation outside of the reflection band so the tunable filters of FIG. 3 will preferably have a relatively low reflectivity, including the range from 50 to 99.99 per cent, the limit on rejection now being due to back reflection at the input to the second circulator and back-scatter within the circulators.

In operation an input signal comprising a set of wavelength encoded channels $S_{IN}$ may be introduced into the Input port 21. This set $S_{IN}$ may be made up from a set $S_T$ of channels to be passed and a set $S_D$ of channels to be dropped ($S_{IN}=S_T+S_D$). The series of filters in optical guide 25 between first and second circulators 20, 30 is arranged to select channels for dropping from the plurality of input channels $S_{IN}$. This is achieved by the filters selectively reflecting only those channels selected for dropping, i.e., those channels in set $S_D$, and passing those selected for passing, i.e., those in set $S_T$. Hence the optical energy incident on the second port 32 of second circulator 30 is due to the set $S_T$ of channels and also due to the residual energy of set $\Delta_D$ of residual fractions arising from the non-reflected residual fractions of the channels of set $S_D$ passed by the "imperfect" filters of the first series. This combined signal $S_T+\Delta_D$ passes through second circulator 30, emerging at the third port 33 thereof from where it passes into the second series of filters in optical guide 35 between second and third circulators 30, 40. This series of filters is arranged to reflect the set of through channels $S_T$ and to pass the residual fractions $\Delta_D$ of set $S_D$. These residual fractions $\Delta_D$ together with any residual fractions $\Delta_T$, arising from non-reflected elements of the channels of set $S_T$ passed by the "imperfect" filters of the second series, then pass into third circulator 40 at the third port 43 thereof and emerge (are dumped) at the next circulator port 42 (i.e. the Dump port).

The set $S_D$ of channels reflected by the first series of filters in optical guide 25 re-enter first optical circulator 20 at port 23 thereof and pass through first optical circulator 20 to emerge at port 22 thereof, thus forming an output signal comprising drop channel set $S_D$ at the drop port.

A set $S_A$ of new, add wavelength encoded channels having wavelengths in common with those of the dropped set $S_D$ and possibly carrying different modulation, may be introduced into third optical circulator 40, via the Add port 41. These add channels pass through the third circulator 40 to emerge at the third port 43 thereof and pass via optical guide 35 to the second series of the filters. As the add channels occupy some of the same wavelengths in the spectrum as the drop channels whose residuals $\Delta_D$ are passed by the second series of filters, they will also be passed by the second series of filters and will enter the second circulator 30 at the third port 33 thereof and will pass through second circulator 30 to emerge from Thru' port 31 so that both the add $S_A$ and the through $S_T$ channel sets are passed out from Thru' port 31 on second circulator 30 thus creating an output signal comprising output set of channels $S_{out}=S_T+S_A$.

The circulators may be of a design capable of passing both polarization and of any design that offers progression from circulator port n to circulator port n+1 (where n is the number of the port) for at least 3 ports. The term optical circulator is used here to refer to such a device without restriction as to the form of the circulator, in particular without requiring the capability to re-circulate at some stage from a number n port back to the first port.

Figure 4:
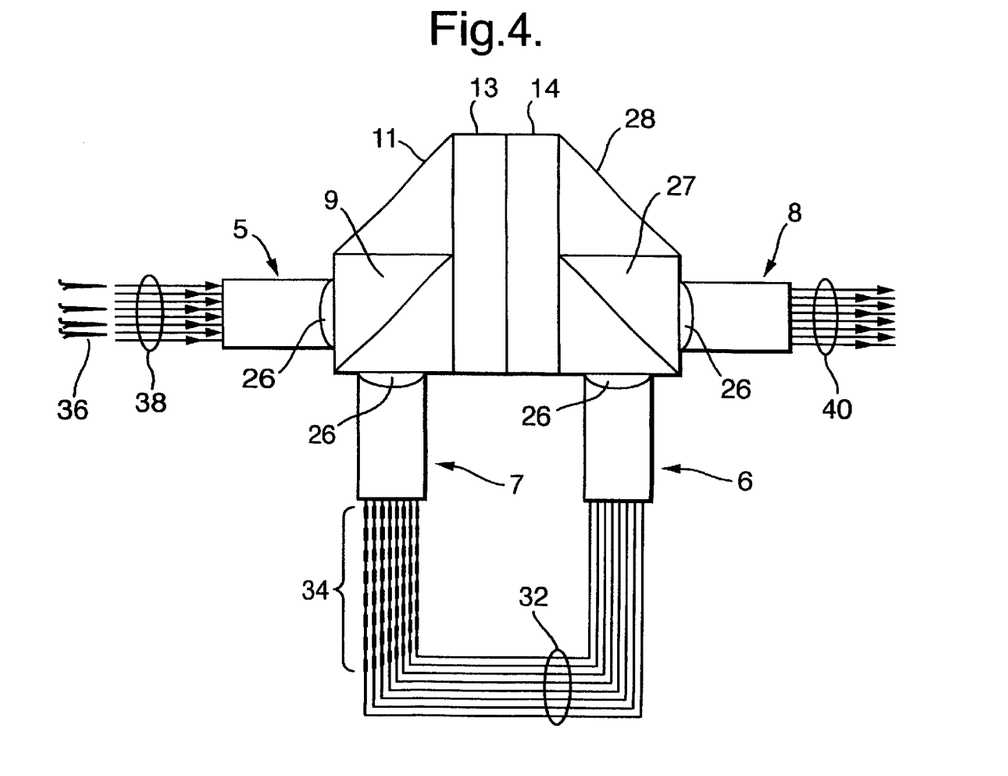
FIG. 4 shows an optical circulator for use in a second embodiment of the present invention.

A suitable optical circulator is the subject of co-pending patent application GB 98 26108.4 in the name of Marconi Communications Ltd and is shown by way of example in FIG. 4. FIG. 4 shows a photonics system in which a plurality of optical signals represented diagrammatically by the series of peaks 36 input on separate optical beams are circulated simultaneously in a single optical isolator. Referring to FIG. 4, there is shown an optical circulator comprising four ports 5, 6, 7 and 8. It will be noted that operation of the optical circulator is not reciprocal in that light input at port 5 is transmitted to port 6 but not vice versa. The optical circulator will now be described in more detail with reference to the figure. In this embodiment, lenses 26 are positioned at the entry to the optical circulator at each of ports 5 to 8. The lenses function to focus light input at one port at the corresponding output port. Lenses are not essential as this function could be achieved by means of other focussing means such as suitably curved mirrors.

Light entering the optical circulator at port 5 will encounter polarizing mirror 9. The polarizing mirror 9 functions to split the light into two orthogonally polarized beams that travel along different paths through the optical circulator. For example, light input at port 5 will be split such that light with a first polarization travels straight through the polarizing mirror 9 whereas light with an orthogonal polarization will be reflected through ninety degrees causing it to hit mirror 11 where it is reflected a second time. At the center of the optical circulator are two polarization rotators each of which acts to rotate the polarization of incident light through an angle of forty-five degrees. The first polarization rotator 13 acts reciprocally in that light passing in one direction (e.g. from left to right in the figure) will have its polarization rotated clockwise and light passing in the opposite direction (e.g. from right to left in the figure) will have its polarization rotated anti-clockwise. In contrast the second polarization rotator 14 is a so-called Faraday rotator which acts in a non-reciprocal way. The directional properties of the Faraday Rotator material are influenced by magnetic fields and, in practice, a saturating magnetic field will be applied to it. Light passing through the Faraday rotator in a first direction (e.g. from left to right in the figure) will have its polarization rotated in a first direction, say clockwise. Light passing through the Faraday rotator 14 in the opposite direction (e.g. from right to left in the figure) will have its polarization also rotated clockwise. The effect of these two different types of polarization rotator arranged together in the centre of the optical isolator so that all light input at any port must pass through both elements is as follows. Light passing through the rotators in a first direction (in our above example from left to right) will undergo a polarization rotation in a clockwise direction of forty-five degrees in element 13 and a further rotation in a clockwise direction of forty-five degrees in element 14 resulting in an overall rotation of ninety degrees. However, light travelling through the rotating elements in the opposite direction (in our example above from right to left) will undergo a polarization rotation in a clockwise direction of forty-five degrees in polarizing element 14 and a contrary polarization rotation of forty-five degrees in an anti-clockwise direction in element 13 resulting in an overall rotation of zero degrees, i.e. the light passes straight through with no overall change in its orientation of polarization.

Operation of the optical circulator of FIG. 4 will now be illustrated by describing the passage of light through the optical circulator from port 5 to port 6. As mentioned above, light input at port 5 first passes through lens 26 and encounters polarizing mirror 9 where that portion of the input light with a first polarization passes straight through the polarizing mirror, whilst light with the orthogonal polarization is reflected by the polarizing mirror through ninety degrees. The light passing straight through the polarizing mirror will experience an overall rotation of polarization of ninety degrees as explained above as a result of passing through polarization rotation elements 13 and 14. The light will then encounter the second polarizing mirror 27. This light now has an orthogonal polarization compared with the light transmitted by the first polarizing mirror 9 and will therefore be reflected through ninety degrees and directed out at port 6.

The portion of the input light with orthogonal polarization which was reflected at the first polarizing mirror 9 undergoes a second reflection through ninety degrees at mirror 11 and subsequently passes through polarization rotation elements 13 and 14, undergoing an overall polarization rotation of ninety degrees in exactly the same way as the light transmitted through the first polarizing mirror 9, as described above. After leaving the polarization rotation elements 13 and 14 the light is reflected again through ninety degrees by the second mirror 28 so as to enter the second polarizing mirror 27 from the top, as shown in the figure. However the light entering the top of the polarizing mirror 27 has a different polarization due to the ninety degree rotation undergone in the rotational elements 13 and 14 and therefore passes straight through the second polarizing mirror 27 to issue at port 6.

In a similar way light entering the optical circulator at any of the ports will be split according to polarization and routed separately so as to issue from the appropriate port. The passage of light input at port 6 will now briefly be described to demonstrate the non-reciprocal operation of the optical circulator. Light input at port 6 with a first polarization will be reflected in second polarizing mirror 27 so that it passes through polarization rotation element 14 and element 13 from right to left. As explained above this introduces no overall rotation in polarization so that the light entering first polarizing mirror 9 from rotational elements 13 and 14 has the same polarization as the light reflected by second polarizing mirror 27 with the result that this light is also reflected through ninety degrees by first polarizing mirror 9 and hence it issues from port 7 rather than port 5. In a similar way, light input at port 6 and transmitted by second polarizing mirror 27 will similarly be passed by first polarizing mirror 9 (after reflection at mirrors 28 and 11 and passing through rotational elements 13 and 14) such that this light also issues from port 7.

As illustrated in FIG. 4 a plurality of optical signals 36 are presented at port 5 via a plurality of input optical guides 38 to produce an array of light sources adjacent to the input of the optical circulator at port 5. Focussing means 26 interposed between the optical circulator and the array of light sources at port 5 produces an image at port 6 of the light sources. Hence arrangement of FIG. 4 provides a multi-channel optical circulator (MCOC), by which is meant an optical circulator capable of independently routing a plurality of optical signals. In the example illustrated by FIG. 4, the input optical guides 38 at port 5 are positioned so that the images generated at port 6 coincide with optical guides 32 looping around from port 6 to port 7. Each optical guide 32 comprises a series of optical filters 34. By virtue of the optical circulator operation, signals input at port 7 will propagate through the optical circulator and issue from port 8. With each image at port 6 of port 5 light sources aligned with one of the guides 32 as described above, a signal input at port 5 can be made to travel through a selected one of the guides 32 to one of the optical wavelength filters 34 at port 7. If this optical wavelength filter is set to pass the wavelength corresponding to a channel carried by that signal, then that channel will enter the optical circulator at port 7 and issue from port 8. If the optical wavelength filter is set to reflect the wavelength corresponding to a channel carried by that signal, then that channel will pass back through optical guides 32, re-enter the optical circulator at port 6 and will pass through the optical circulator to emerge at port 7 thereof.

Figure 5:
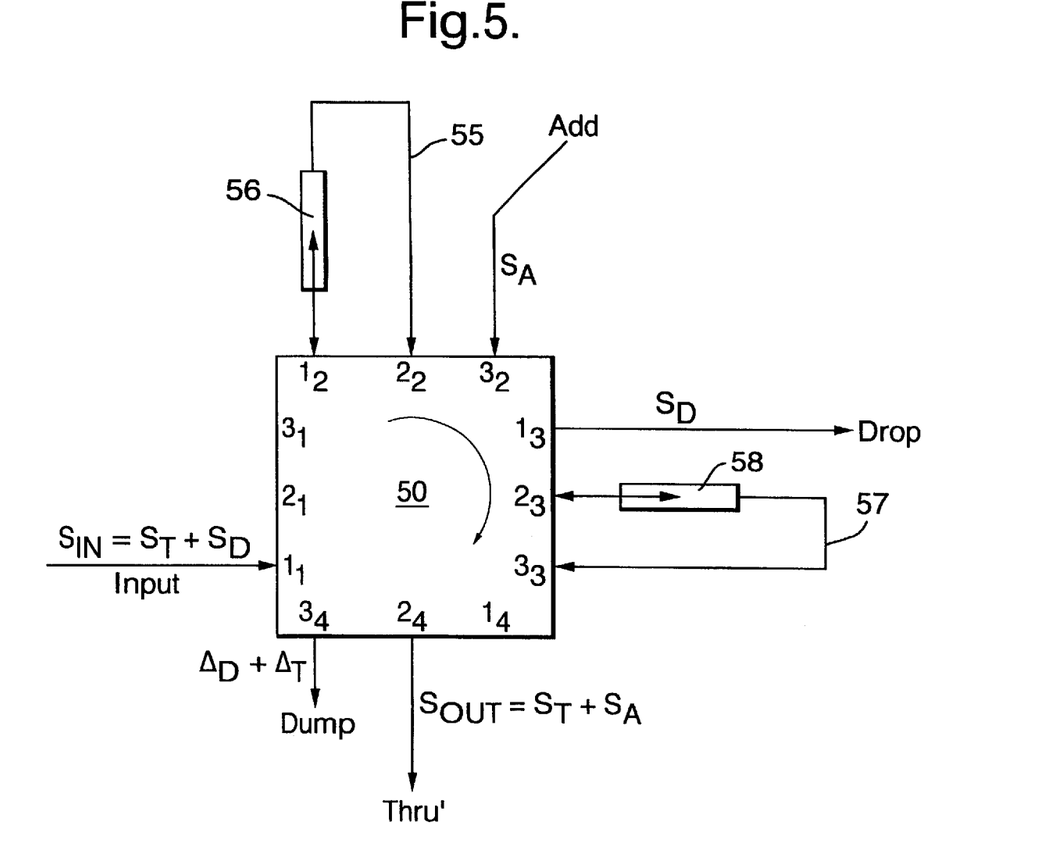
FIG. 5 shows an alternative add-drop arrangement according to a second embodiment of the present invention.

If a sufficient number of separate paths are arranged through it, then a single optical circulator can be used in a second embodiment in place of the three optical circulators of the first embodiment as shown schematically in FIG. 5. FIG. 5 shows an alternative form of add-drop multiplexer according to a second embodiment of the invention advantageously using only a single optical circulator.

The add-drop multiplexer of FIG. 5 comprises optical circulator 50 with a plurality of ports $1_1$–$1_4$, $2_1$–$2_4$ and $3_1$–$3_4$.

As with the arrangement of FIG. 3, the add-drop multiplexer of FIG. 5 comprises five external ports: Input, $1_1$, Drop $1_3$, Through (Thru') $2_4$, Add $3_2$ and Dump $3_4$. The function of these ports is as described above with reference to the arrangement of FIG. 3 and will not be described further here.

An optical guide 55, e.g. an optical fibre or waveguide, links a first port $1_2$ of optical circulator 50 with a second port $2_2$. A second optical guide 57 links a third port $2_3$ with a fourth port $3_3$. Each optical guide 55, 57 contains a series of tunable optical filters (56, 58 respectively). As with the arrangement of FIG. 3, these tunable filters have a relatively low reflectivity.

In operation an input signal, i.e. a set $S_{IN}$ of wavelength encoded channels, may be introduced into the Input port $1_1$. This set $S_{IN}$ may be made up from a set $S_T$ of through channels to be passed and a set $S_D$ to be dropped by the add drop multiplexer ($S_{IN}=S_T+S_D$). The channels entering the optical circulator at the input port $1_1$ pass through the circulator to emerge from port $1_2$ where they enter optical guide 55 in which they encounter the first series of filters 56. The filters 56 in the first series are arranged to select channels for dropping from the plurality of input channels. This is achieved by the filters 56 selectively reflecting only those channels selected for dropping, i.e., those channels in set $S_D$ and passing those selected for passing, i.e., those in set $S_T$.

Following reflection in the first series of filters 56, the channels of set $S_D$ re-enter optical circulator 50 at first port $1_2$ and pass through the optical circulator to emerge from the Drop port $1_3$ so forming a drop signal comprising the channels of set $S_D$. Set $S_T$ together with any unwanted residual energy arising from the non-reflected (residual) fractions $\Delta_D$ of the channels of set $S_D$ passed by the "imperfect" filters 56 of the first series passes through optical guide 55 to re-enter optical circulator at port $2_2$. Hence the optical energy incident from optical guide 55 at port $2_2$ of optical circulator 50 is due to this combined signal $S_T+\Delta_D$ which passes through optical circulator 50 emerging at port $2_3$ thereof from where it enters second waveguide 57 in which it encounters second series of filters 58. Second series of filters 58 is arranged to reflect the set of through channels $S_T$ and to pass the residuals fractions $\Delta_D$ of set $S_D$. These residual fractions $\Delta_D$ together with any residual fractions $\Delta_T$, arising from the non-reflected fraction of the set $S_T$ passed by the "imperfect" filters of the second series 58, then pass via optical guide 57 back into the circulator at the third port $3_3$ thereof and emerge (are dumped) at the Dump port $3_4$.

The set of through channels $S_T$ reflected by second series of filters 58 in second optical guide 57 re-enter the circulator at port $2_3$ thereof, emerging at Thru' port $2_4$ thereof. A set $S_A$ of new, add wavelength encoded channels having wavelengths in common with some or all of those of the dropped set $S_D$ and possibly carrying different modulation, may be introduced into optical circulator 50, via the Add port $3_2$. The set $S_A$ of add channels passes through the circulator 50 to emerge at port $3_3$ thereof As described above, port $3_3$ connects to one end of second optical guide 57 which acts to guide the set $S_A$ of add channels to second series of filters 58. As the add channels occupy some of the same wavelengths in the spectrum as the drop channels whose residuals $\Delta_D$ are passed by second series of filters 58, they will also be passed by the second series of filters 58 and will re-enter circulator at port $2_3$ thereof in a similar fashion to the set $S_T$ of through channels reflected by second series of filters 58. Having re-entered optical circulator 50 in a similar fashion to the through channels, the set $S_A$ of add channels follows the same path as the set $S_T$ of through channels through the optical circulator to emerge from Thru' port $2_4$ thereof, so that both the add $S_A$ and the through $S_T$ channel sets pass out from Thru' port $2_4$ of circulator 50 thus creating an output signal comprising an output-set of channels $S_{out}=S_T+S_A$.

In a preferred embodiment, an extra set $S_E$ of new wavelength encoded channels (not shown) having wavelengths in common with some or all of those of the through set $S_T$ of channels may be added to the drop signal at port $1_3$. According to this preferred embodiment, channels of set $S_E$ are input at port $2_1$ of optical circulator 50 and pass through the optical circulator to emerge at port $2_2$ thereof where they enter optical guide 55 in which they encounter first series of filters 56. As the channels of set $S_E$ share some of the same wavelengths as the set $S_T$, they will be passed by filters 56 and will re-enter optical circulator 50 at port $1_2$ in the same way as the set $S_D$ reflected by filters 56 and will pass through optical circulator 50 to emerge at port $1_3$ thereof together with set $S_D$ to form an output signal comprising sets of channels $S_D$ and $S_E$.

Hence, according to the present invention, an OADM overcomes the design compromises of the prior art by arranging that any unwanted residual power associated with fractions of channels arising from unwanted transmission at less than perfect filters can be separated from wanted channels and "dumped" at a separate port.

Figure 6:
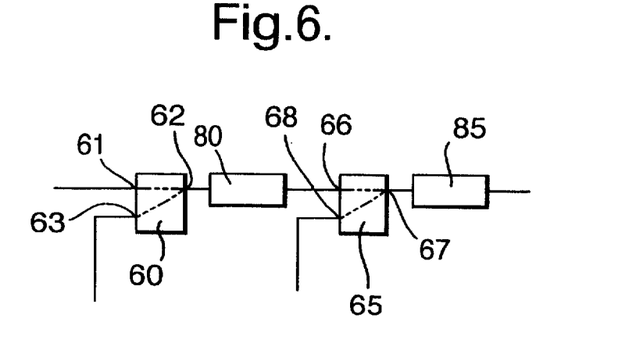
FIG. 6 shows an optical switching arrangement according to a third embodiment of the present invention.

FIG. 6 shows an embodiment of the present invention as applied to optical switches. FIG. 6 shows optical circulator 60 with three ports 61–63 and optical circulator 65 also with three ports 66–68 and two series 80, 85 of optical filters, e.g. fibre Bragg gratings. The various elements of FIG. 6 are connected by optical guides such as optical fibres or waveguides. Optical circulator 60 is connected, via port 62 and optical filters 80 to port 66 on optical circulator 65. Optical circulator 65 is connected via port 67 to optical filters 85.

The operation of the arrangement of FIG. 6 in switching two optical channels will now be described. An input signal comprising two optical channels is applied to port 61 of optical circulator 60 and passes through the optical circulator to emerge at port 62 thereof. The input signal passes from port 62 through an optical guide to optical filters 80 which are arranged to reflect a first input channel and to pass a second channel. The first input channel reflected by optical filters 80 returns to re-enter first optical circulator 60 at port 62 thereof and passes through optical circulator 60 to emerge at port 63 thereof. The second input channel passed by optical filters 80 passes through an optical guide to enter second optical circulator 65 at port 66 thereof. The second optical channel passes through second optical circulator 65 to emerge at port 67 thereof and then passes via an optical guide to second optical filters 85. Optical filters 85 are arranged to reflect the second input optical channel and to pass the wavelength band corresponding to the first input optical channel. As a result, the second input optical channel returns to re-enter second optical circulator 65 at port 67 thereof and passes through second optical circulator 65 to emerge at port 68 thereof. Hence the two channels comprised in the input optical signal have been separated out by switching with the first channel output from port 63 and the second channel output from port 68. However, a different switching result may be achieved by control of optical filters 80 and 85. Each series of optical filters 80 and 85 contain one tunable filter for each of the input channels. Each filter can be tuned to selectively pass or reflect the corresponding channel. It is therefore possible to arrange that first series of filters 80 act to pass the first channel and reflect the second channel and that second series of filters 85 act to reflect the first channel and pass the second channel. This would result in the input channels being separated with the second input channel being output from port 63 and the first input channel being output from port 68. It will be readily apparent that, by setting one or more of the series of optical filters to either reflect all or transmit all input channels both input channels may be output from either port 63, port 68 or from the end of second filters 85 away from optical circulator 65.

As indicated above in relation to the OADM embodiments, highly reflective filters have the undesirable effect of attenuating channels outside of the wavelength band of the filter. This problem may be overcome by selecting low reflectivity filters, however these have the disadvantage of unwanted residual fractions of an optical channel being passed at a filter.

The arrangement of FIG. 6 overcomes the problem of unwanted residual fractions by ensuring that each optical channel output is reflected before output thereby separating any unwanted residual fractions of optical channels from the switched output channels. The way in which this separation is achieved is illustrated by way of the following example. If the filters of FIG. 6 are set up so that the first filter 80 reflects the first optical input channel and passes the second optical input channel and so that the second filter 85 passes the first optical input channel (or wavelengths corresponding to the first channel) and reflects the second optical input channel, then any unwanted residual fraction of the first optical input channel (created due to unwanted transmission in "imperfect" filters 80), that passes together with the second input channel on to second series of filters 85, will be transmitted by series of filters 85 and thereby separated from the second input channel when it is reflected by series of filters 85. The end of series of filters 85 distant from optical circulator 65 may be thought of as a form of "Dump" port for dumping the unwanted residual fractions. Similarly, in the arrangements of FIGS. 7 and 8, described below, the end of any series of filters that does not feed into an optical circulator may be thought of as a similar form of "Dump" port.

The embodiment on the invention shown in FIG. 6 as a two-channel optical switch has a simple arrangement of optical circulators and optical filters arranged in series. If it was desired to increase the number of channels switched by the switch, this could be achieved by merely adding further optical circulators and optical filters in series with optical filters 85 of FIG. 6. However, for large numbers of channels, this would have the disadvantage that the last channel to be switched would have to pass through every preceding stage of the switch thereby experiencing unacceptable attenuation. The arrangements of FIGS. 7 and 8 advantageously achieve the switching of large numbers of channels whilst minimizing the number of optical circulator/series of filter stages any one channel has to pass through before being switched.

Figure 7:
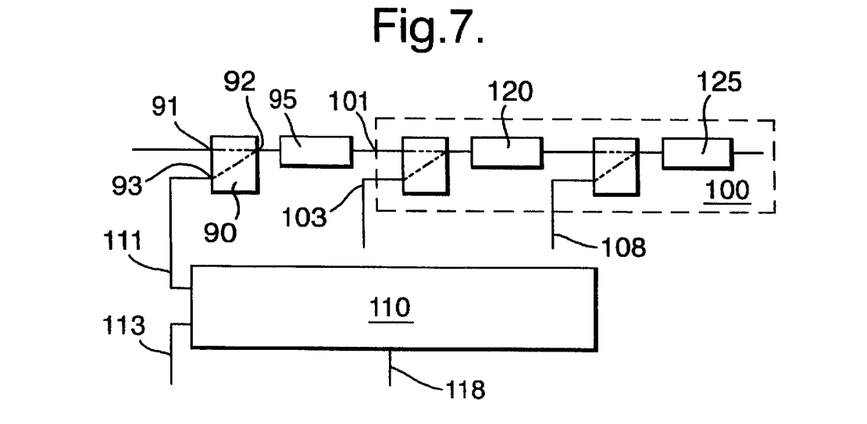
FIG. 7 shows an optical switching arrangement according to a fourth embodiment of the present invention.

FIG. 7 shows the application of the present invention to a four channel optical switch. Referring to FIG. 7, optical circulator 90 is provided with a three ports 91–93 and is connected to series of optical filters 95 via port 92 and an optical guide connected therebetween. Optical filters 95 are connected at the end away from optical circulator 90 to a functional block 100. It will be seen that functional block 100 contains an arrangement similar to that of FIG. 6 with ports 101, 103, 108 of functional block 100 corresponding to ports 61, 63 and 68 of the arrangement of FIG. 6, i.e. port 101 is arranged to receive two optical channels and ports 103 and 108 are arranged to each output one of these input optical channels. Filter series 120 and 125 of functional block 100 correspond to filter series 80 and 85 of FIG. 6 respectively.

Port 93 of optical circulator 90 is connected via an optical guide to functional block 110. Functional block 110 is identical to functional block 100 and no further description will be given here except to point out that ports 111, 113, 118 of functional block 110 correspond to ports 101, 103 and 108 of functional block 100.

The operation of the arrangement of FIG. 7 will now be described. In operation port 91 of optical circulator 90 receives 4 optical input channels via an optical guide. The 4 optical input channels pass through optical circulator 90 to emerge from port 92 thereof and are then guided via an optical guide to series of optical filters 95. Series of optical filters 95 may be arranged to selectively reflect selected ones of the input optical channels. For the purposes of the four channel switch, series of optical filters 95 is arranged to reflect two of the input optical channels and pass the other two. The two optical input channels reflected by series of optical filters 95 returns to port 92 on optical circulator 90 and passes through optical circulator 90 to emerge at port 93 thereof. At port 93 the pair of reflected input optical channels are guided by an optical guide to port 111 of functional block 110. As indicated above, functional block 110 operates in a manner exactly similar to the arrangement of FIG. 6 to selectively switch the two input channels received at port 111 onto separate output ports 113, 118.

The pair of optical input channels passed by series of optical filters 95 are guided by an optical guide to port 101 of functional block 100. As indicated above, functional block 100 operates in an identical manner to the arrangement of FIG. 6 to switch the two input channels received at port 101 to separate output ports 103, 108. Hence by controlling the operation of the various series of optical filters of FIG. 7, any arbitrary input optical channel may be output at any one of the 4 output ports 103, 108, 113, 118. In addition, in a similar way to the arrangement of FIG. 6, any unwanted residual fractions of input channels generated by transmission in "imperfect" filters will be separated from the selected output channels.

In a similar way to the arrangement of FIG. 6, this separation is achieved by arranging for each series of filters to pass any residual fractions of channels that it may receive from other filters. By way of example, in the arrangement of FIG. 7, series of filters 120 will pass any residual fractions of channels passed by series of filters 95 due to the imperfect reflection therein. Similarly, series of filters 125 will pass any residual fractions of channels passes by series of filters 120 due to the imperfect reflection therein and any residual fractions of channels passed by series of filters 95 due to imperfect reflection therein and then passed by series of filters 120 by design.

Figure 8:
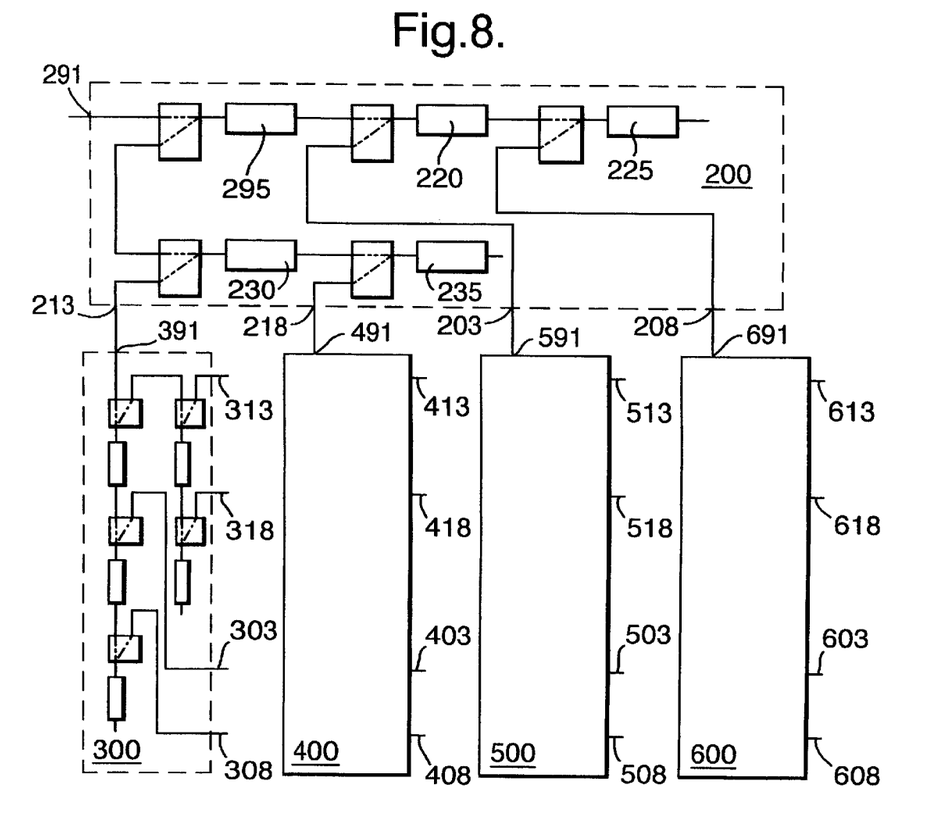
FIG. 8 shows an optical switching arrangement according to a fifth embodiment of the present invention.

FIG. 8 shows the present invention applied to a 16-channel optical switch. The 16-channel optical switch of FIG. 8 comprises functional blocks 200, 300, 400, 500 and 600. Output port 213 of functional block 200 is connected by an optical guide to input port 391 of functional block 300. In a similar way output ports 218, 203 and 208 of functional block 200 are connected to input ports 491, 591 and 691 of functional blocks 400, 500 and 600 respectively. It is apparent from the Figure that the arrangement of functional block 200 with input port 291 and 4 output ports 213, 218, 203 and 208 is similar to that of the four channel switch of FIG. 7. However, instead of operating as a four channel switch, functional block 200 is arranged to selectively switch 16 optical input channels. In operation functional block 200 is arranged to receive 16 optical input channels at input port 291 and to selectively switch any four of the input optical channels to output from output port 203; to selectively switch any four of the remaining twelve input optical channels to output from output port 208; to selectively switch any four of the remaining eight input optical channels to output from output port 213 and to switch the remaining four input optical channels to output from output port 218. Hence functional block 200 differs from the four channel switch of FIG. 7 in that the series of filters of functional block 200 are arranged to handle larger numbers of channels. In particular, series of filters 295 acts to reflect any eight channels from sixteen, filter series 200 and 230 act to reflect four channels from eight and filter series 225 and 235 act to reflect four channels from four received. Any channels not reflected by a series of filters are passed.

For full switching flexibility, each series of filters would have the ability to reflect any one of the input channels (e.g. in the case of functional block 200, all sixteen input channels requiring sixteen filters per series). If less flexibility were acceptable, cost may be saved by reducing the number of filters in some of the series of filters.

It will be apparent from FIG. 8 that the function of functional block 300 is identical to that of the four channel switch of FIG. 7, i.e. selectively switching a different one of the four optical input channels input at port 391 to selected ones of output ports 313, 318, 303, 308. Hence ports 303, 308, 313, 318 and 391 of functional block 300 correspond exactly with ports 103, 108, 113, 118 and 91 of the four channel switch of FIG. 7. Functional blocks 400, 500 and 600 are identical to functional block 300. No further description will be given here of the functional blocks 400, 500, 600 except to say that input ports 491, 591 and 691 correspond exactly with input port 391 of functional block 300 and similarly output ports 403, 503, 603 correspond to output port 303; output ports 408, 508, 608 correspond to output port 308; output ports 413, 513, 613 correspond to output port 313; and output ports 418, 518, 618 correspond to output port 318 of functional block 300.

The operation of the arrangement of FIG. 8 will now be described. In operation sixteen wavelength encoded input optical channels are input at port 291 of functional block 200. Series of optical filters 295 will operate to selectively reflect 8 of the input optical channels, causing them to be guided and passed to series of optical filters 230, and to selectively pass the other eight input optical channels, causing them to be guided and passed to series of optical filters 220. Series of optical filters 220 will operate to selectively reflect four of the eight input channels received from series of optical filters 295, causing them to be guided and passed via port 203 to port 591 of functional block 500, and to selectively pass the other four channels received from series of filters 220, causing them to be guided and passed to series of filters 225. Series of filters 225 acts to reflect all four optical channels passed by series of filters 220, causing them to be guided and passed via port 208 to input port 691 of functional block 600. In a preferred embodiment, filter series 225 and the associated optical circulator may be omitted and the channels passed by filter series 220 guided by an optical guide (not shown) directly to port 691 of functional block 600.

Series of filters 230 acts to selectively reflect four of the optical input channels reflected by series of filters 295, causing them to be guided and passed via port 213 to input port 391 of functional block 300, and to selectively pass the other four channels reflected by series of optical filters 295, causing them to be guided and passed to series of optical filters 235. Series of optical filters 235 acts to reflect all four optical input channels passed by series of optical filters 230, causing them to be guided and passed to input port 491 of functional block 400. In a preferred embodiment filter series 235 and the associated optical circulator may be omitted and the channels passed by filter series 230 guided by an optical guide (not shown) directly to port 491 of functional block 400.

Hence each of functional blocks 300, 400, 500 and 600 receive, in operation, a set of four channels selected by functional block 200 from the set of 16 optical input channels. Each of functional blocks 300, 400, 500 and 600 operate in an identical manner to the arrangement of FIG. 7 to selectively switch each one of the four optical channels input to the functional block such that a different optical channel is output from each of the four output ports thereof. Hence the sixteen channel switch of FIG. 8 operates to selectively switch each of the sixteen input channels to a selected one of the sixteen output ports.

Hence, according to the present invention, an optical switch is provided in which switched output optical channels are produced without the inclusion therein of unwanted fractions of other optical channels, by arranging that any unwanted residual power, associated with fractions of channels arising from unwanted transmission at less than perfect filters, is separated from switched channels and "dumped" at a separate port.

It will be apparent that the invention is not limited to the switching embodiments shown in FIGS. 6, 7 and 8, but may be applied to optical switches for switching any number of input channels.

I claim:

1. An optical switching means having a plurality of ports, the switching means being operative for forming at the plurality of ports from a plurality of wavelength encoded input optical channels a plurality of output optical signals having wavelength encoded output optical channels, the switching means comprising:

a) a plurality of selective reflectors each selective reflector being operative for reflecting a first portion of a selected input optical channel to form an output channel, and for passing a residual portion of the selected input optical channel; and b) separation means for separating the residual portions from the output signals.

2. The optical switching means of claim 1, and further comprising a port for dumping the residual portions separate from the output signals.

3. The optical switching means of claim 1, in which the plurality of selective reflectors comprise a first set of selective reflectors operative for passing a first set of selected optical input channels and for reflecting a second set of selected optical input channels; and a second set of selective reflectors operative for reflecting the first set of selected optical input channels, and for passing the second set of selected optical input channels.

4. An optical add-drop multiplexer (OADM) comprising the optical switching means of claim 1.

5. The OADM of claim 4, and further comprising three optical circulators.

6. The OADM of claim 4, and further comprising only a single optical circulator.

7. The OADM of claim 4, for also receiving one or more additional optical channels, the OADM further comprising adding means for adding the additional optical channels to one of the output optical signals.

8. An optical switch comprising the optical switching means of claim 1.

9. The optical switch of claim 8, and further comprising a plurality of optical circulators.

10. The optical switch of claim 9, in which, in operation, each switched input optical channel only passes through some of the plurality of optical circulators.

11. The optical switch of claim 9, and further comprising a plurality of interconnected branches in which each branch comprises one or more optical circulators and one or more selective reflectors connected in series.

12. An optical network comprising the optical switching means of claim 1.

13. A telecommunications network comprising the optical switching means of claim 1.

14. An optical switching means having a plurality of ports, the switching means being operative for forming at the plurality of ports from a plurality of wavelength encoded input optical channels a plurality of output optical signals having wavelength encoded output optical channels, the switching means comprising:

a) a plurality of selective reflectors each selective reflector being operative for reflecting a first portion of a selected input optical channel to form an output channel, and for passing a residual portion of the selected input optical channel, said plurality of selective reflectors comprising a first set of selective reflectors operative for passing a first set of selected optical input channels and for reflecting a second set of selected optical input channels, and a second set of selective reflectors operative for reflecting the first set of selected optical input channels, and for passing the second set of selected optical input channels; and b) separation means for separating the residual portions from the output signals.

15. The optical switching means of claim 14, and further comprising a port for dumping the residual portions separate from the output signals.

16. An optical add-drop multiplexer (OADM) comprising the optical switching means of claim 14.

17. The OADM of claim 16, and further comprising three optical circulators.

18. The OADM of claim 16, and further comprising only a single optical circulator.

19. The OADM of claim 16, for also receiving one or more additional optical channels, the OADM further comprising adding means for adding the additional optical channels to one of the output optical signals.

20. An optical switch comprising the optical switching means of claim 14.

21. The optical switch of claim 20, and further comprising a plurality of optical circulators.

22. The optical switch of claim 21, in which, in operation, each switched input channel only passes through some of the plurality of optical circulators.

23. The optical switch of claim 21, and further comprising a plurality of interconnected branches in which each branch comprises one or more optical circulators and one or more selective reflectors connected in series.

24. An optical network comprising the optical switching means of claim 14.

25. A telecommunications network comprising the optical switching means of claim 14.

* * * * *